J. G. KNAPP.
DISH WASHING MACHINE.
APPLICATION FILED MAR. 13, 1908.
959,355.
Patented May 24, 1910.
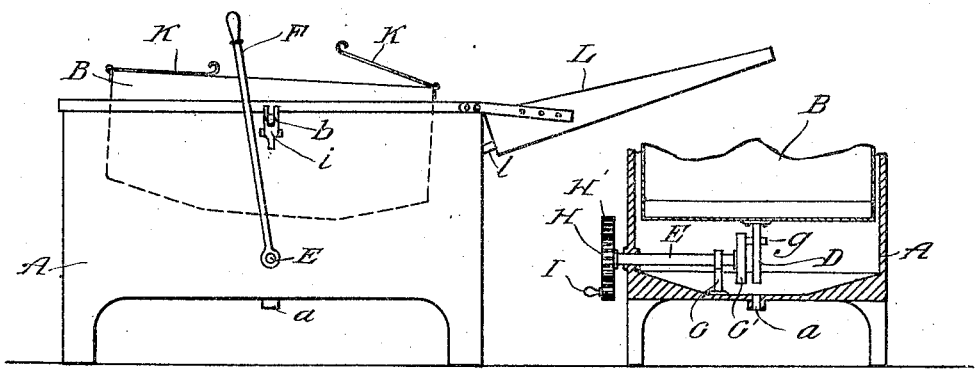
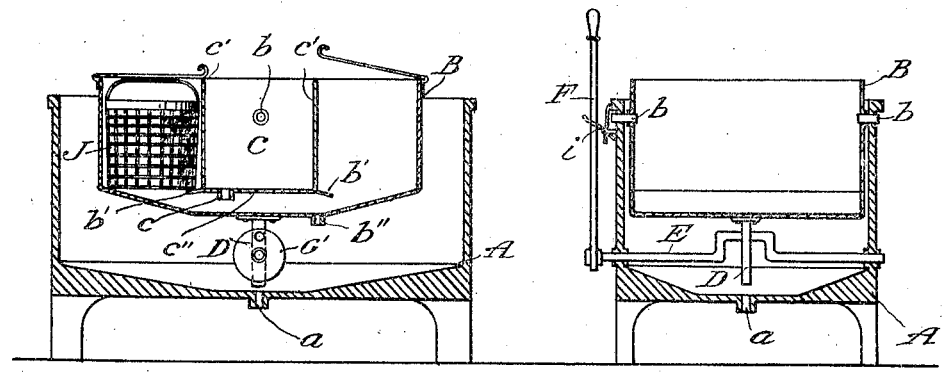
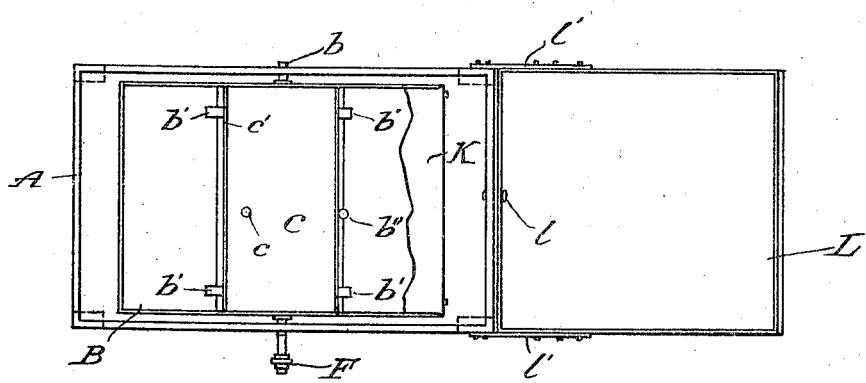

UNITED STATES PATENT OFFICE.

JOHN G. KNAPP, OF BOONVILLE, NEW YORK.

DISH-WASHING MACHINE.

959,355.  Specification of Letters Patent.  Patented May 24, 1910.

Application filed March 13, 1908. Serial No. 420,799.

*To all whom it may concern:*

Be it known that I, JOHN G. KNAPP, a citizen of the United States, residing at Boonville, in the county of Oneida and State of New York, have invented certain new and useful Improvements in Dish-Washing Machines, of which the following is a specification, reference being had therein to the accompanying drawing.

My invention relates to an improved dish-washing machine, and I declare the following is a full, clear, concise and exact description thereof, sufficient to enable one skilled in the art to make and use the same, reference being had to the accompanying drawings in which like letters refer to like parts throughout.

A feature of the device is in the means provided for placing and removing the dishes, the character of the motion of the device and the resulting action of the water and the rinsing tank.

Other features will appear in the specifications and drawings.

Figure 1 is a side view of the machine showing part of the outline of the inner member by dotted lines. Fig. 2 is a side view in section on substantially the center line showing a form of operating means. Fig. 3 is a view partially in cross section to show part of the operating mechanism. Fig. 4 is a like view showing another form of operating mechanism. Fig. 5 is a top view.

Referring to the drawings in detail the machine comprises a stationary tank A, water tight, with drainage outlet a. Within the tank A is swung a tilting tank B mounted relatively near the top by trunnions b on the fixed tank A. The tank B is of a size to swing freely in tank A, the ends alternately rising and falling. The tank B has its bottom sloping downward from the ends as seen in Fig. 2 and has drain-hole b″ near the center. Within the tank B is a water-tight box or rinsing tank C with drainage c, the box being formed with sides c′, c′ connected to the sides of the tank B and a bottom c″ above the bottom of the tank so that water in the tank flows free from one end to the other when the tank is tilted.

The tilting of tank B is effected by any suitable means, two examples of which are indicated. In the style shown in Fig. 4, D, is a depending loop on the bottom of the tank and a crank shaft E provided with a crank arm is mounted in the tank A, the crank-arm engaging the loop D so that the oscillation of the shaft E by means of the lever F swings the tank B in its trunnions and tilts either end up. In Figs. 2 and 3 there is the loop D, substantially as before, the shaft E being supported in the wall of tank A and in a bracket G suitably mounted. At the inner end of the shaft is pitman wheel G′ with pin g, in the loop. The shaft has suitable gear members illustrated by H and H′ to which power is applied by belt or other suitable means illustrated by handle I, to revolve the shaft and tilt the tank B. At i is a swinging clip to engage lever F in given position, to hold the tank in place. This will represent any means suitable for locking the tank in place for loading or unloading.

In operation the dishes are placed in basket J, one in each end compartment of the tank B if desired, supported on clips b′ and on the bottom of the tank. Water being put in the tank, the mechanism is set in motion to tilt the tank when the water rushes from one end to the other, some pouring up from beneath box C and some rushing to the end of the tank and there turned back onto the dishes. To prevent splashing when one of the compartments is empty, covers K are provided to inclose, more or less, the end compartments. When the action of the rushing water has cleaned the dishes the basket is lifted out and the dishes rinsed in the water of tank or box C and then placed on outwardly swinging shelf L, mounted by strip l′ on tank A and having outlet l connected to tank A.

Having described my invention, what I claim as new and desire to secure by Letters Patent, is:

1. A machine of the character described comprising a tank, a tilting tank mounted therein having two interior partitions with a bottom connected thereto and spaced above the bottom of the tilting tank, means on said partitions for supporting (in conjunction with the bottom of the tilting tank) dish-receptacles substantially on a level, and means for oscillating the tilting tank to and fro, substantially as described.

2. In a machine of the character described, the combination of a main tank and a secondary tank pivotally mounted therein and having partitions fixed therein whereby to form an inner receptacle and outer receptacles in the secondary tank, the bottom of the former or inner receptacle being spaced above the bottom of the main tank with a passage therebetween, and means for supporting dish-carriers in the outer receptacles in the secondary tank, substantially as described.

3. A machine of the character described comprising a tank, a tilting tank mounted therein having two interior partitions with a bottom connected thereto and spaced above the bottom of the tilting tank, and means for oscillating the tilting tank to and fro, substantially as described.

4. In a device of the character described, a pivotally mounted washing tank having its bottom with a dip between the ends and walls with a bottom connected therewith placed transverse the tank between its ends, the said bottom being spaced above the bottom of the washing tank to provide a clearance between the bottom thereof and the bottom of the inner tank, whereby to force the water from end to end of the tank and agitate it in each such end of the washing tank as the same is tilted to and fro.

In testimony whereof I affix my signature in presence of two witnesses.

JOHN G. KNAPP.

Witnesses:
E. T. DE GIORGI,
HENRY M. LOVE.